(12) United States Patent (10) Patent No.: US 7,309,015 B2
Frantz et al. (45) Date of Patent: Dec. 18, 2007

(54) MOBILE DEVICE GATEWAY PROVIDING ACCESS TO INSTANT INFORMATION

(75) Inventors: Didier Frantz, New York, NY (US); Avi Outmezguine, Brooklyn, NY (US)

(73) Assignee: Scanbuy, Inc., New York, NY (US)

( * ) Notice: Subject to any disclaimer, the term of this patent is extended or adjusted under 35 U.S.C. 154(b) by 0 days.

(21) Appl. No.: 11/168,806

(22) Filed: Jun. 28, 2005

(65) Prior Publication Data

US 2006/0011728 A1 Jan. 19, 2006

Related U.S. Application Data

(60) Provisional application No. 60/587,250, filed on Jul. 14, 2004.

(51) Int. Cl.
*G06K 7/10* (2006.01)

(52) U.S. Cl. .................................. 235/462.46

(58) Field of Classification Search ............ 235/462.46
See application file for complete search history.

(56) References Cited

U.S. PATENT DOCUMENTS

| | | |
|---|---|---|
| 4,238,768 A | 12/1980 | Mitsuya et al. |
| 4,323,973 A | 4/1982 | Greenfield |
| 4,554,593 A | 11/1985 | Fox et al. |
| 4,578,766 A | 3/1986 | Caddy |
| 4,692,603 A | 9/1987 | Brass et al. |
| 4,728,783 A | 3/1988 | Brass et al. |
| 4,754,127 A | 6/1988 | Brass et al. |
| 4,774,569 A | 9/1988 | Morton et al. |
| 4,782,221 A | 11/1988 | Brass et al. |

(Continued)

FOREIGN PATENT DOCUMENTS

WO WO-05/020140 A2 3/2005

(Continued)

OTHER PUBLICATIONS

Trier, O.D., Jain, A.K., "Goal-Directed Evaluation of Binarization Methods", Pattern Analysis and Machine Intelligence, IEEE Transactions on, Dec. 1995, ISSN: 0162-8828.

(Continued)

*Primary Examiner*—Michael G. Lee
*Assistant Examiner*—Tae W. Kim
(74) *Attorney, Agent, or Firm*—Wilmer Cutler Pickering Hale and Dorr LLP

(57) ABSTRACT

The present invention relates generally to the field of systems capable of managing the interaction between vendors and end users. To use the system, a user first scans any common barcode using a mobile device. The barcode information along with a user identification number is then sent to a server. The server uses the user identification number to look up the user's preferred vendors and content providers. The manufacturer code from the barcode is also looked up in a vendor database. Once the preferences have been determined, this information is sent to each vendor and content provider which returns information, a list of options, and/or other content. This information is then aggregated into a WAP page by the server and transmitted to the mobile device. The user utilizes the mobile device to select a content provider or vendor.

17 Claims, 2 Drawing Sheets

U.S. PATENT DOCUMENTS

| | | | |
|---|---|---|---|
| 4,874,936 A | 10/1989 | Chandler et al. |
| 4,896,029 A | 1/1990 | Chandler et al. |
| 4,969,202 A | 11/1990 | Groezinger |
| 4,998,010 A | 3/1991 | Chandler et al. |
| 5,016,118 A | 5/1991 | Nannichi et al. |
| 5,103,490 A | 4/1992 | McMillin |
| 5,113,454 A | 5/1992 | Marcantonio et al. |
| 5,153,418 A | 10/1992 | Batterman et al. |
| 5,179,599 A | 1/1993 | Formanek |
| 5,189,292 A | 2/1993 | Batterman et al. |
| 5,223,701 A | 6/1993 | Batterman et al. |
| 5,235,172 A | 8/1993 | Oehlmann et al. |
| 5,243,443 A | 9/1993 | Eschbach |
| 5,243,444 A | 9/1993 | Fan |
| 5,243,655 A | 9/1993 | Wang |
| 5,276,315 A | 1/1994 | Surka |
| 5,327,240 A | 7/1994 | Golston et al. |
| 5,331,442 A | 7/1994 | Sorimachi et al. |
| 5,345,317 A | 9/1994 | Katsuno et al. |
| 5,510,604 A | 4/1996 | England et al. |
| 5,621,203 A | 4/1997 | Swartz et al. |
| 5,691,773 A | 11/1997 | Wang et al. |
| 5,767,978 A | 6/1998 | Revankar et al. |
| 5,778,092 A | 7/1998 | MacLeod et al. |
| 5,783,811 A | 7/1998 | Feng et al. |
| 5,811,781 A | 9/1998 | Ackley |
| 5,852,677 A | 12/1998 | Nakamura et al. |
| 5,862,270 A | 1/1999 | Lopresti et al. |
| 5,877,486 A | 3/1999 | Maltsev et al. |
| 5,890,021 A | 3/1999 | Onoda et al. |
| 5,909,505 A | 6/1999 | Katayama et al. |
| 5,915,039 A | 6/1999 | Lorie et al. |
| 5,963,669 A | 10/1999 | Wesolkowski et al. |
| 5,969,325 A | 10/1999 | Hecht et al. |
| 6,045,515 A | 4/2000 | Lawton |
| 6,082,619 A | 7/2000 | Ma et al. |
| 6,091,511 A | 7/2000 | Ben Dror et al. |
| 6,101,285 A | 8/2000 | Fan |
| 6,115,488 A | 9/2000 | Rogers et al. |
| 6,115,508 A | 9/2000 | Lopresti et al. |
| 6,137,898 A | 10/2000 | Broussard et al. |
| 6,201,612 B1 | 3/2001 | Matsushiro et al. |
| 6,201,901 B1 | 3/2001 | Zhou et al. |
| 6,282,307 B1 | 8/2001 | Armato, III et al. |
| 6,347,156 B1 | 2/2002 | Kamada et al. |
| 6,366,696 B1 | 4/2002 | Hertz et al. |
| 6,371,373 B1 | 4/2002 | Ma et al. |
| 6,418,244 B2 | 7/2002 | Zhou et al. |
| 6,431,452 B2 | 8/2002 | Feng |
| 6,446,868 B1 | 9/2002 | Robertson et al. |
| 6,512,919 B2 | 1/2003 | Ogasawara |
| 6,565,003 B1 | 5/2003 | Ma |
| 6,585,157 B2 | 7/2003 | Brandt et al. |
| 6,604,682 B2 | 8/2003 | Wakamiya et al. |
| 6,631,012 B2 | 10/2003 | Athens et al. |
| 6,631,843 B2 | 10/2003 | Schuessler |
| 6,650,766 B1 | 11/2003 | Rogers et al. |
| 6,674,919 B1 | 1/2004 | Ma et al. |
| 6,735,341 B1 | 5/2004 | Horie et al. |
| 6,735,745 B2 | 5/2004 | Sarig et al. |
| 6,752,317 B2 | 6/2004 | Dymetman et al. |
| 6,802,450 B2 | 10/2004 | Cheung et al. |
| 6,832,729 B1 | 12/2004 | Perry et al. |
| 6,837,432 B2 | 1/2005 | Tsikos et al. |
| 6,898,329 B1 | 5/2005 | Takahashi et al. |
| 2001/0041581 A1 | 11/2001 | Hansson |
| 2002/0071076 A1 | 6/2002 | Webb et al. |
| 2002/0084330 A1 | 7/2002 | Chiu |
| 2002/0090107 A1 | 7/2002 | Acharya et al. |
| 2002/0102966 A1 | 8/2002 | Lev et al. |
| 2002/0187774 A1 | 12/2002 | Ritter et al. |
| 2003/0007696 A1 | 1/2003 | Saito |
| 2003/0074286 A1 | 4/2003 | Rodrigo |
| 2003/0123710 A1 | 7/2003 | Nakazawa et al. |
| 2004/0042670 A1 | 3/2004 | Moroo et al. |
| 2004/0101183 A1 | 5/2004 | Mullick et al. |
| 2004/0240737 A1 | 12/2004 | Lim et al. |
| 2005/0035206 A1 | 2/2005 | Attia et al. |
| 2005/0121521 A1 | 6/2005 | Ghai et al. |
| 2005/0198095 A1* | 9/2005 | Du et al. .................... 709/200 |

FOREIGN PATENT DOCUMENTS

WO    WO-05/062234 A2    7/2005

OTHER PUBLICATIONS

Heckbert, Paul S., "Fundamentals of Texture Mapping and Image Warping," Department of Electrical Engineering and Computer Science, University of California, Master's Thesis, 1989.

Lew, Michael S., "Principles of Visual Information Retrieval," State of the Art in Shape Matching, 2001, pp. 87-119.

Rohs, Michael et al., "Entry Points into a Smart Campus Environment-Overview of the ETHOC System," Institute for Pervasive Computing Swiss Federal Institute of Technology.

Tsai, Roger Y., "A Versatile Camera Calibration Tedhnique for High-Accuracy 3D Maching Vision metrology Using Off-the-Shelf TV Cameras and Lenses," IEEE Journal of Robotics and Automation, 1987, RA-3(4):323-344.

Wellner, Pierre D., "Adaptive Thresholding for the DigitalDesk," EuroPARC Technical Report EPC-93-110, 1993, pp. 1-17.

Bottller, Stefan. "SMS-Flaschenpost erreicht Millionen," W&V Wochenmagazin Fur Marketing, Werbung, Medien und E-Business, Nov. 28, 2003, pp. 44-45.

Rohs, Michael et al., "Entry Points into a Smart Campus Environment-Overview of the ETHOC System," Institute for Pervasive Computing Swiss Federal Institute of Technology, ICDCS 2003 Workshops, May 2003.

* cited by examiner

MOBILE DEVICE GATEWAY PROVIDING ACCESS TO INSTANT INFORMATION

PARENT CASE TEXT

This application claims the benefit of provisional application No. 60/587,250 filed Jul. 14, 2004 and entitled "Mobile device control center utilizing barcode scanning technology."

FIELD OF THE INVENTION

The present invention relates generally to the field of systems capable of managing the interaction between vendors and end users. More specifically, the present invention provides a gateway for mobile devices which provides quick access to various information and content from different vendors.

BACKGROUND OF THE INVENTION

Many systems currently exist which use an input to access different online resources. The most common example of such a system is a search engine such as Yahoo, Google, AltaVista, etc. Search engines allow users to search one or more databases using different combinations of search terms and Boolean connectors. The results are usually displayed in a list form, with the most relevant results at the top of the list. These search engines provide quick access to information. However, using such systems it is often difficult to access specific information. For example, if a user is looking for information on a particular person or product type, the search engine will return every instance of the search term. It may take the user a long period of time to sift through the information and find the specific link or information the user was looking for.

Recently, search engines have also become available for mobile devices which have Internet access. The user can use the keypad on the mobile device to type in keywords and search the Internet much like a user would on a computer. However, due to the small sized screen and the vast amount of search results, it is usually even more difficult to sift through the results on the mobile device than on a computer.

Simple database systems also currently exist which use an input term to produce one or more outputs. An example of such a system is the barcode scanning terminal and register used at most shopping centers. As the cashier scans the different products in each consumer's shopping cart, the barcode scanning terminal uses a database to associate each barcode with a price, item name, and/or item description. The register then uses this information to compute the total of the purchase. This system allows the checkout process to be extremely streamlined and efficient. However, the database requires much maintenance since every type of item in the store must be included in the database. This can lead to an extremely large database which requires a great deal of maintenance. For example, the database needs to be updated each time the store adds a new item or changes an item's price.

Currently, there are systems available which can be used to link printed barcode information directly to online content using barcode scanners. These systems typically function by using the scanner to scan the barcode, connect the scanner to a computer, upload the barcode information to a server, search a barcode database to retrieve information, and send the information back to the mobile device. Since most mobile devices are not associated with an add-on barcode scanner, these systems have not yet been widely adopted. Also, these systems suffer from the burden that each barcode needs to be in the database in order for the system to function.

With the advent of camera phones and other similar mobile devices equipped with digital cameras, technology has been developed to decode barcodes from digital images. For example, a system for decoding barcodes on mobile devices from digital images is disclosed in U.S. patent application Ser. No. 10/757,095. This allows camera phones to be used as mobile barcode scanners. Therefore, camera phones can now be utilized with systems which link printed barcode information directly to online content.

Therefore, there clearly exists a need for a system which links users with mobile devices equipped with a barcode scanner or digital camera to online content without the burden of maintaining a large and extensive barcode database. Such a system would allow user's quick and reliable access to online content with minimal cost to the supplier and/or vendor.

SUMMARY OF THE INVENTION

The present invention discloses a system and method for a mobile gateway which is used to manage and distribute information scanned from mobile device users to vendors. The system utilizes a mobile device equipped with a barcode scanner or digital camera, at least one item with a barcode, a wireless network, a server having a plurality of different databases (e.g., a user database and a vendor database), and a plurality of vendors and/or content providers. The mobile device may be any device capable of transmitting data over the wireless network such as a cell phone, a camera phone, a personal digital assistant, etc.

Barcodes compatible with the present invention are usually found on products or in advertisements. However, it should be apparent to one skilled in the art how the barcode could be any one or two-dimensional barcode from a symbology including, but not limited to, UPC-A, UPC-E, ISBN, RSS-14, RSS-14E, RSS-14L, Interleaved 2 of 5, EAN/JAN-8, EAN/JAN-13, Code 39, Code 39 Full ASCII, Code 128, PDF417, QR Code, Data Matrix, and/or proprietary two-dimensional codes.

The wireless network may be any network capable of transmitting information wirelessly between a mobile device and a computer and/or other mobile device. For example, the wireless network could be a cellular network, satellite network, Bluetooth network, Wi-Fi network, etc.

To use the system, a user first scans the barcode using the mobile device. The user may scan the barcode either using a barcode scanner attached to the mobile device or by using the digital camera attached to or embedded in the device. If the user elects to take a picture of the barcode, it may be decoded optically on the device. A system for decoding barcodes on mobile devices from digital images is disclosed in co-pending U.S. patent application Ser. No. 10/757,095, which is incorporated herein by reference. The user could also decide to take a picture of the barcode and send the snapshot or the raw data constituting the image to the control center to be decoded on a server instead of the handset (see U.S. patent application Ser. No. 10/796,153, which is incorporated herein by reference).

After the barcode has been decoded, the barcode information and a user identification number are sent to a server via a wireless network. In the case where the barcode is decoded by the server, the user will send the user identification number and either the snapshot or the raw data of the barcode image. The server then uses the transmitted user identification number to look up the user's preferred vendors using a user database. The user database associates each user identification number with a list of preferred vendors. The server next parses the barcode into its constituent parts if possible. For example, every UPC-A barcode contains a manufacturer code, a product code, and a checksum digit.

The manufacturer code, or other similar identifying information, contained within the barcode information is used to associate the scanned barcode with a list of vendors or content providers using a vendor and/or content provider database. The server then transmits the entire decoded barcode to each of the vendors and content providers. Preferably, this step is accomplished by sending the data to the different vendors' web services via an XML post.

Each vendor and content provider returns a list of options, and/or detailed information related to the barcode to the server. Preferably, this information is transmitted back to the server via XML. The server uses the information provided by the vendors/content providers to generate a WAP page on-the-fly by aggregating the information into a newly formatted page. The WAP page, list of options, content, and/or detailed information is then displayed on-screen. In a preferred embodiment, the server also utilizes information contained within the user database to construct the WAP page. For example, the user database may contain layout and/or other information which the user has preselected. The user utilizes the content of the page and/or number of options to execute the desired transaction.

Therefore, it is an object of the present invention to provide a mobile gateway capable of supplying quick and reliable content via a dynamic WAP page to users without the burden of maintaining a large and static product barcode database.

It is an additional object of the present invention to provide a mobile gateway in which the content from the vendors and/or content providers is sent to the mobile device via a newly generated WAP page.

Another object of the present invention is to provide a mobile gateway in which the mobile device only receives content which has been formatted by the server.

An additional object of the present invention is to provide a mobile gateway which sidesteps tedious data entry and poor web navigation on mobile devices.

Another object of the present invention is to provide a mobile gateway which brings content and services to users with minimum required interaction.

Yet a further object of the present invention is to provide a mobile gateway that has the possibility to work with many vendors and content providers that would be prioritized based on user preferences.

An additional object of the present invention is to provide the ability to view information available on mobile devices which was previously not accessible.

These and other objects of the present will be made clearer with reference to the following detailed description and accompanying drawings.

DETAILED DESCRIPTION OF THE PREFERRED EMBODIMENT(S)

The following presents a detailed description of a preferred embodiment (as well as some alternative embodiments) of the present invention. However, it should be apparent to one skilled in the art that the described embodiment may be modified in form and content to be optimized for a wide variety of situations.

Figure 1:
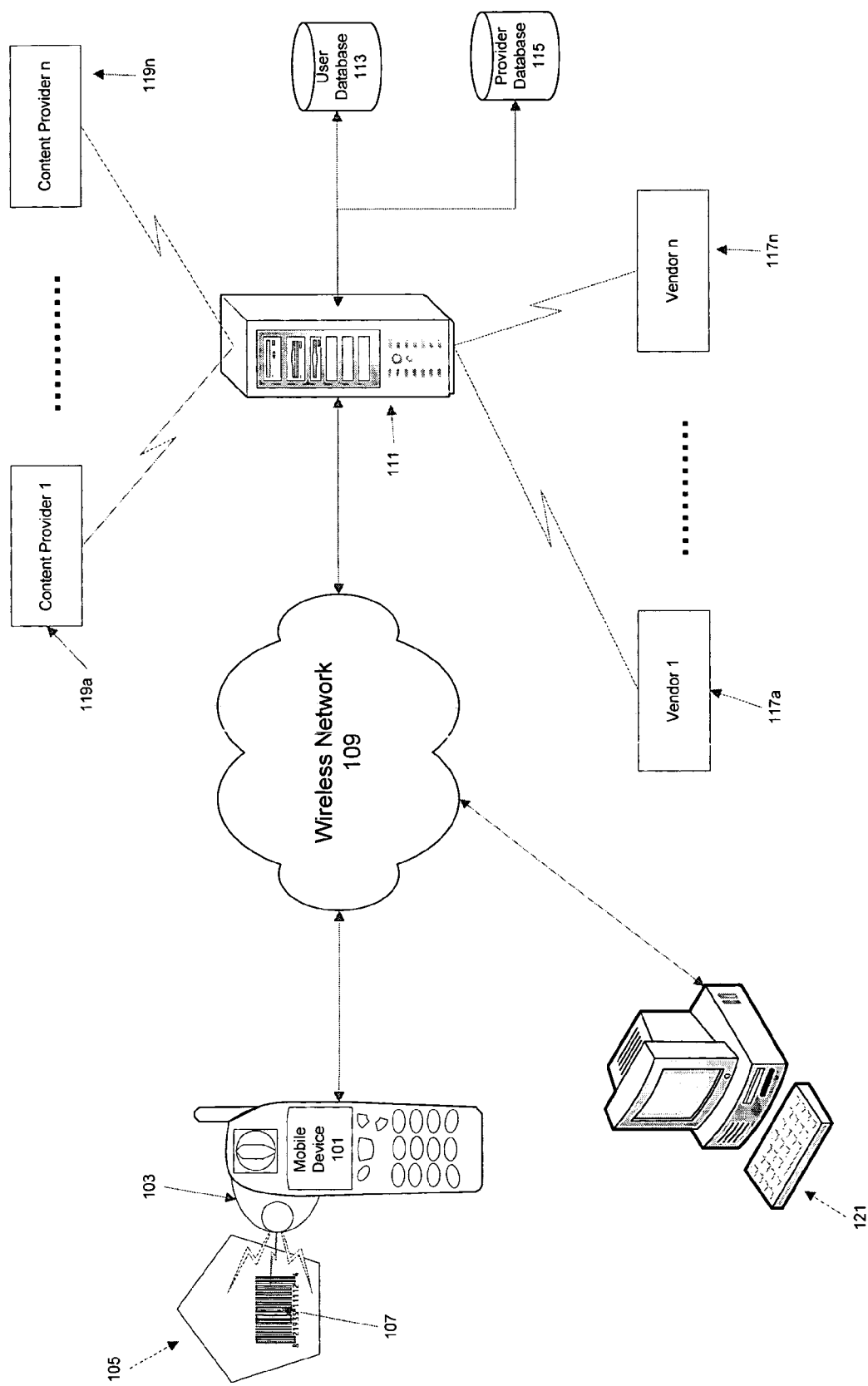
FIG. 1 depicts a system diagram showing the preferred setup of the mobile gateway.

With reference first to FIG. 1, shown is a system diagram depicting the setup of the preferred embodiment of the present invention. To function, the system utilizes mobile device 101 equipped with barcode scanner or a digital camera 103, at least one item 105 with a barcode 107, wireless network 109, server 111, user database 113, provider database 115, vendors 117a to 117n, and content providers 119a to 119n. Mobile device 101 may be any device capable of transmitting data over wireless network 109 such as a cell phone, a camera phone, a personal digital assistant, a web camera attached to a computer, etc.

Item 105 is preferably a product or other similar item of commerce. However, it should be apparent to one skilled in the art that item 105 may be any object to which a barcode can be attached such as an advertisement, a poster, a ticket, etc. Similarly, barcode 107 could be any one or two-dimensional barcode from a symbology including, but not limited to, UPC-A, UPC-E, ISBN, RSS-14, RSS-14E, RSS-14L, Interleaved 2 of 5, EAN/JAN-8, EAN/JAN-13, Code 39, Code 39 Full ASCII, Code 128, PDF417, QR Code, Data Matrix, and any proprietary two-dimensional barcode. Preferably, barcode 107 is a UPC-A barcode which is typically composed of a manufacturer code, an item code, and a check digit.

It should also be obvious to one skilled in the art that barcode 107 could be any machine-readable code, such as an RFID code. This would require only that digital camera 103 be replaced with a RFID reader. The rest of the system could still function utilizing the information decoded from the RFID code.

Wireless network 109 may be any network capable of transmitting information wirelessly between mobile device 101 and server 111. For example, the wireless network could be a cellular network, satellite network, Bluetooth network, Wi-Fi network, etc.

Server 111 is equipped with user database 113 and provider database 115. User database 113 is a standard database which stores users' identification numbers, preferred vendors, and preferred content providers and is capable of being modified and updated in real-time. Provider database 115 associates each manufacturer code with a list of categories and vendors and/or content providers.

Vendors 117a-117n may be any one of a plurality of online retailers. Content providers 119a-119n may be any online provider of production information or media content.

Figure 2:
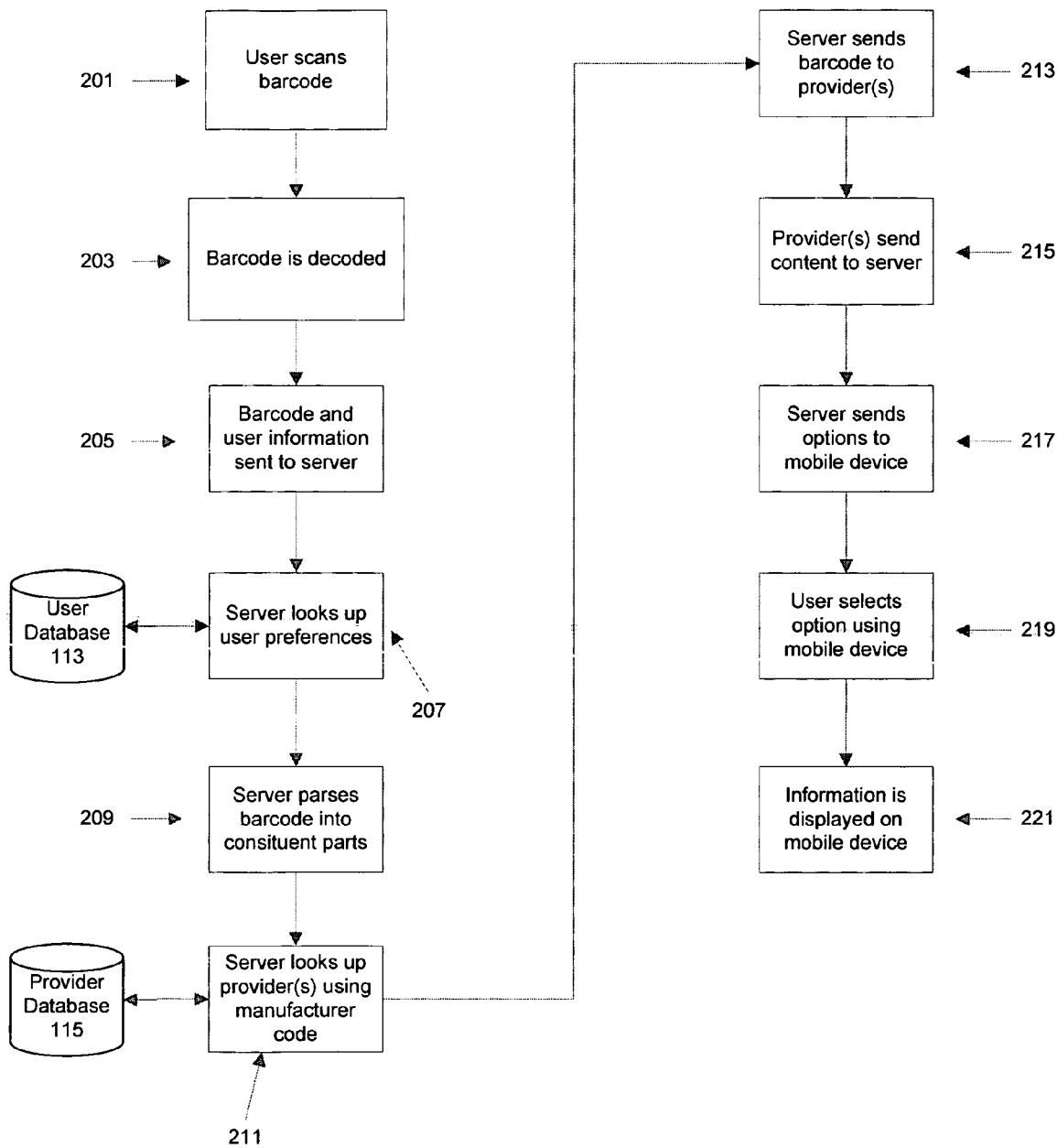
FIG. 2 depicts a flowchart showing the process used by the mobile gateway to provide content from vendors or content providers to users.

Next referring to FIG. 2, shown is a flowchart depicting the operation of the mobile gateway. To use the mobile gateway of the present invention, a user first scans barcode 107 using barcode scanner 103 attached to mobile device 101 in step 201. Barcode 107 is then decoded in step 203. Barcode 107 may be decoded by barcode scanner 103 in a variety of ways. In the preferred embodiment of the present invention, barcode scanner 103 is a digital camera. A system for decoding barcodes on mobile devices from digital images is disclosed in co-pending U.S. patent application Ser. No. 10/757,095 entitled "System and method for decoding and analyzing barcodes using a mobile device." The user could also decide to take a picture of the barcode using barcode scanner 103 and send the snapshot or the raw data constituting the image to the control center to be decoded on server 111 instead of on mobile device 101. Such a system is disclosed in co-pending U.S. patent application Ser. No. 10/796,153 entitled "System and method for decoding barcodes using digital imaging techniques."

Alternatively, barcode scanner 103 may be a laser-based scanner which is integral to or attached to mobile device 101. Currently, laser-based scanners are the most commonly used barcode scanners. However, they generally lack the versatility of optical barcode scanners and can only usually decode a limited number of barcode symbologies.

After the barcode has been decoded in step 203, the barcode information and a user identification number are sent to server 111 via wireless network 109 in step 205. In the case where the barcode is decoded by server 111, mobile device 101 sends the user identification number and either the snapshot or the raw data of the barcode image. Otherwise, just the decoded barcode number is sent. Server 111 then uses the transmitted user identification number to look up the user's preferred vendors and content providers using user database 113 in step 207. User database 113 associates each user identification number with a list of preferred vendors. The server next parses the barcode into its constituent parts if possible in step 209. This step is generally performed when barcode 107 is a UPC-A barcode comprised of a manufacturer code, a product code, and a checksum digit.

The manufacturer code contained within barcode 107 information is used by server 111 in step 211 to associate item 105 with a list of vendors or content providers using provider database 115. Server 111 may also associate the manufacturer code with a category of items including, but not limited to, home furnishings, accessories, gifts, curtains/drapes, linens, house wares, china glass and silver, home lighting products, agricultural, farming, floral (non-food), alcoholic beverages, apparel, audio/video, automotive, building supplies, computer hardware, software, food, beverage, food service, furniture, general merchandise, health and beauty products, healthcare, hobbies, crafts, sewing equipment, household and industrial chemicals, lawn and garden products, marine equipment and supplies, market research data, musical instruments, professional sound equipment, sheet music, office and school supplies, stationary, gift wrap, greeting cards, pet food and supplies, home electronics, major appliances, camera, binoculars, telescopes, power transmission, books, magazines, holiday seasonal products, sport and exercise equipment, toys, games, tobacco, packaging materials, electrical components, meat, poultry, seafood, maintenance, repair, raw materials, produce, accessories and leather products, shoes, watches, costume and fine jewelry, industrial, and commercial.

Server 111 then transmits the entire decoded barcode to each of the appropriate vendors 117a-117n and content providers 119a-119m (as identified in step 211) in step 213. Each vendor and content provider returns content, a list of options, and/or detailed information to server 111 in step 215. Server 111 then transmits the list of vendors/content providers and/or options or uses the information provided by the vendors/content providers to generate a WAP page on-the-fly by aggregating the information in step 217. The newly created WAP page is specific to each user of the system. That is, the mobile gateway is capable of aggregating and formatting the information, content, and options from vendors 117a-117n and content providers 119a-119m into a format that is easily viewed on the screen of mobile device. The WAP page, list of options, and/or detailed information is then displayed on the screen of the mobile device in step 219. The user utilizes the list of vendors/content providers or option menu to choose a desired vendor/content provider in step 221. The user is then connected directly to the selected vendor or content provider. The user can also utilize the WAP page to perform such actions as viewing a multimedia clip, purchasing the item related to the scanned barcode, etc.

The mobile gateway is also capable of saving the barcodes that a user scans in user database 113. These barcodes can then be accessed at a later time by mobile device 101 or by workstation 121. If a user elects to utilize workstation 121, the user will be able to access the same content using the stored barcodes that the user was able to access utilizing mobile device 101. For example, a user could utilize workstation 121 to purchase an item related to a barcode previously scanned by mobile device 101.

While the foregoing embodiments of the invention have been set forth in considerable detail for the purposes of making a complete disclosure, it should be evident to one skilled in the art that multiple changes may be made to the aforementioned description without departing from the spirit of the invention.

We claim:

1. A method for providing information associated with a barcode, comprising:
    receiving barcode information and a user identifier from a mobile device;
    retrieving first information identifying at least one content provider from a first database based on the user identifier;
    retrieving second information identifying at least one content provider from a second database based on at least part of the barcode information;
    selecting at least one content provider based on the first information and the second information;
    sending the barcode information to the selected at least one content provider;
    receiving content information related to the barcode information from at least one content provider;
    retrieving layout information from the first database based on the user identifier;
    aggregating the received content information to form a WAP page, wherein the layout of the WAP page is based on the retrieved layout information; and
    sending the WAP page to the mobile device.

2. The method of claim 1, further comprising parsing the barcode information into at least two parts including a manufacturer code, wherein the manufacture code comprises the at least part of the barcode information used in retrieving the second information identifying at least one content provider from the second database.

3. The method of claim 1, further comprising receiving an indication of selected content from the mobile device and connecting the mobile device with a content provider associated with the selected content.

4. The method of claim 1, further comprising receiving an indication of selected content from the mobile device and sending the selected content to the mobile device.

5. The method of claim 1, further comprising saving the barcode information.

6. The method of claim 1, wherein the content information describes at least one of multimedia information, books, apparel, electronics, and games.

7. The method of claim 1, wherein the mobile device is at least one of a camera phone, a mobile phone, a PDA, a laptop computer, a smart phone, and a cellular phone.

8. The method of claim 1, where the barcode information is decoded from a barcode selected from the group comprising UPC-A, UPC-E, ISBN, RSS-14, RSS-14E, RSS-14L, Interleaved 2 of 5, EAN/JAN-8, EAN/JAN-13, Code 39 Full ASCII, Code 128, PDF417, QR Code, Data Matrix, and RFID.

9. A system for providing information associated with a barcode, comprising:
an interface in communication with a network;
a memory; and
a processor in communication with the memory and the interface; wherein the processor
receives barcode information and a user identifier from a mobile device;
retrieves first information identifying at least one content provider from a first database based on the user identifier;
retrieves second information identifying at least one content provider from a second database based on at least part of the barcode information;
selects at least one content provider based on the first information and the second information;
sends the barcode information to the selected at least one content provider;
receives content information related to the barcode information from at least one content provider;
retrieves layout information from the first database based on the user identifier;
aggregates the received content information to form a WAP page, wherein the layout of the WAP page is based on the retrieved layout information; and
sends the WAP page to the mobile device.

10. The system of claim 9, wherein the processor further parses the barcode information into at least two parts including a manufacturer code, wherein the manufacture code comprises the at least part of the barcode information used in retrieving the second information identifying at least one content provider from the second database.

11. The system of claim 9, wherein the processor further receives an indication of selected content from the mobile device and connects the mobile device with a content provider associated with the selected content.

12. The system of claim 9, wherein the processor further receives an indication of selected content from the mobile device and sends the selected content to the mobile device.

13. The system of claim 9, wherein the processor further saves the barcode information.

14. The system of claim 9, wherein the content information describes at least one of multimedia information, books, apparel, electronics, and games.

15. The system of claim 9, wherein the mobile device is at least one of a camera phone, a mobile phone, a PDA, a laptop computer, a smart phone, and a cellular phone.

16. The system of claim 9, where the barcode information is decoded from a barcode selected from the group comprising UPC-A, UPC-E, ISBN, RSS-14, RSS-14E, RSS-14L, Interleaved 2 of 5, EAN/JAN-8, EAN/JAN-13, Code 39, Code 39 Full ASCII, Code128, PDF417, QR Code, Data Matrix, and RFID.

17. A computer-readable medium containing computer-executable instructions that, when executed by a processor, cause the processor to perform a method for providing information associated with a barcode the method comprising:
receiving barcode information and a user identifier from a mobile device;
retrieving first information identifying at least one content provider from a first database based on the user identifier;
retrieving second information identifying at least one content provider from a second database based on at least part of the barcode information;
selecting at least one content provider based on the first information and the second information;
sending the barcode information to the selected at least one content provider;
receiving content information related to the barcode information from at least one content provider;
retrieving layout information from the first database based on the user identifier;
aggregating the received content information to form a WAP page, wherein the layout of the WAP page is based on the retrieved layout information; and
sending the WAP page to the mobile device.

* * * * *